Figure 1:
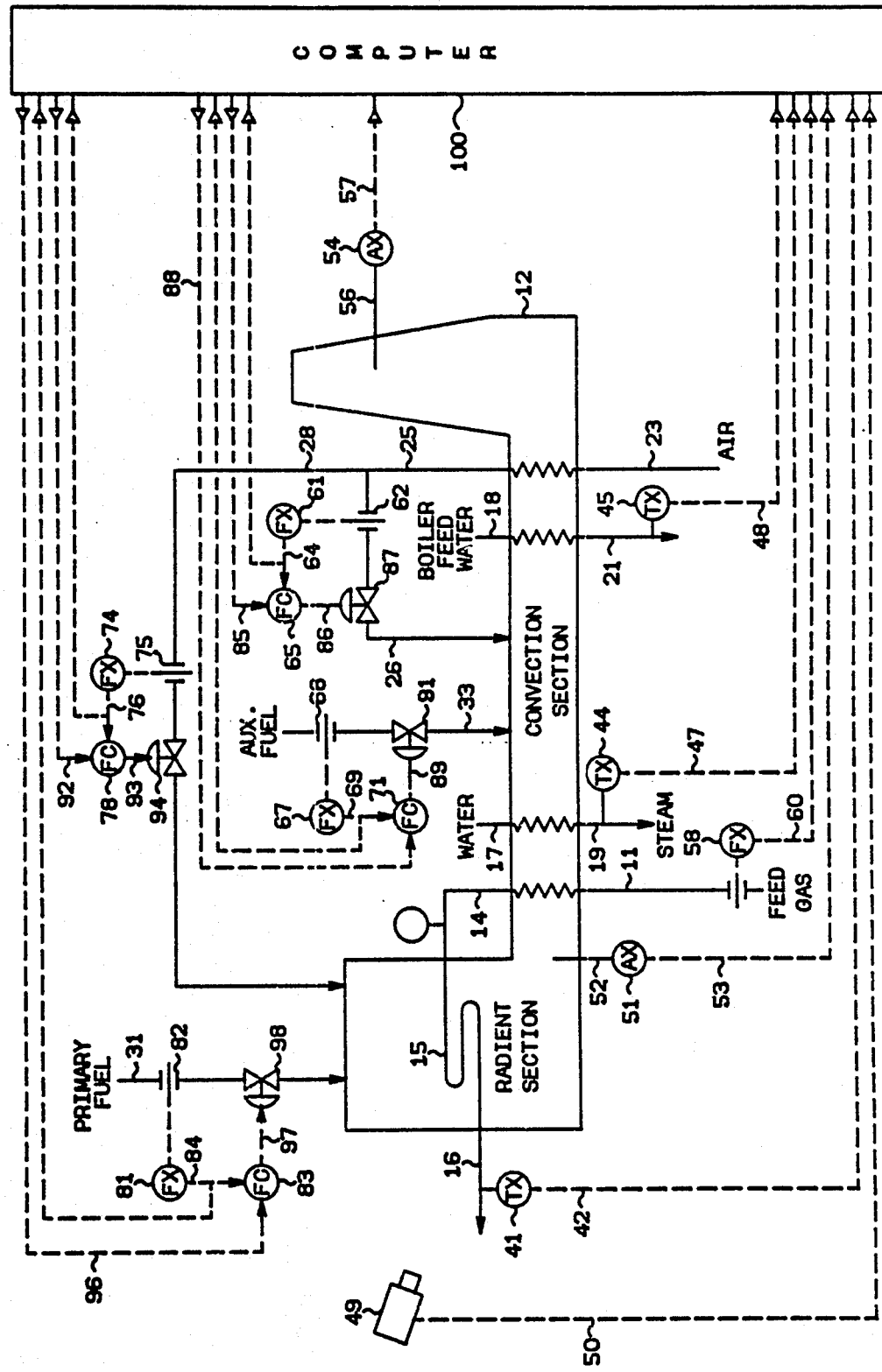

United States Patent [19]

Stewart

[11] Patent Number: 4,473,490
[45] Date of Patent: Sep. 25, 1984

[54] CONTROL OF A REFORMING FURNACE

[75] Inventor: William S. Stewart, Bartlesville, Okla.

[73] Assignee: Phillips Petroleum Company, Bartlesville, Okla.

[21] Appl. No.: 480,201

[22] Filed: Mar. 30, 1983

[51] Int. Cl.³ .............................................. C01B 3/24
[52] U.S. Cl. ........................................ 252/373; 48/94;
  48/196 R; 48/197 R; 48/214 R; 48/DIG. 10;
  364/500; 422/62; 422/109; 518/704
[58] Field of Search ............. 48/196 A, 197 R, 214 A,
  48/214 R, 61, 94, 196 R; 422/62, 109; 364/500;
  252/373; 518/704

[56] References Cited

U.S. PATENT DOCUMENTS

| | | | |
|---|---|---|---|
| 3,120,431 | 2/1964 | Carton et al. | 48/196 A |
| 3,666,932 | 5/1972 | White | 364/500 |
| 3,676,066 | 7/1972 | Pennington | 422/62 X |
| 3,759,820 | 2/1973 | Boyd | 364/501 X |
| 3,979,183 | 9/1976 | Scott | 422/109 |
| 4,072,625 | 2/1978 | Pinto | 252/373 |
| 4,115,862 | 9/1978 | Stewart | 422/109 X |
| 4,187,542 | 2/1980 | Ball et al. | 422/109 X |
| 4,228,509 | 10/1980 | Kennedy | 364/501 |

OTHER PUBLICATIONS

Leeds & Northrup Application Memo, E6.0001-AM, Nov. 1976, "Century Lead-Lag Fuel/Air Ratio for Combustion Processes."

*Primary Examiner*—Peter F. Kratz
*Assistant Examiner*—Joye L. Woodard

[57] ABSTRACT

A reforming furnace having a radiant section containing cracking tubes, a convection section and a stack is controlled so as to maintain a desired synthesis gas temperature unless such maintenance would result in the violation of a process constraint. The desired excess oxygen concentration in the combustion gases withdrawn from the radiant section is also maintained while maintaining the desired synthesis gas temperature. As for the convection section, the temperature of a fluid stream passing through the convection section is maintained while still maintaining a desired excess oxygen concentration in the stack gas.

21 Claims, 2 Drawing Figures

CONTROL OF A REFORMING FURNACE

This invention relates to control of a reforming furnace having both a radiant section and a convection section. In one aspect, this invention relates to method and apparatus for controlling a reforming furnace having a radiant section and a convection section so as to maintain a desired excess oxygen content in the combustion gases removed from the radiant section and a desired excess oxygen content in the stack gas. In another aspect of this invention relates to method and apparatus for maintaining a desired temperature of the synthesis gas withdrawn from the radiant section while not violating a process constraint. In still another aspect, this invention relates to method and apparatus for ensuring that sufficient air will be supplied to the burners in both the radiant section and convection section during times of process upsets.

Reforming furnaces are utilized in many processes to transform a hydrocarbon containing feed gas into a desired synthesis gas for the process. In some processes, the reforming furnace may contain both a radiant section which is utilized to produce the synthesis gas and a convection section which is utilized to produce steam, preheat the feed gas, preheat the boiler feed water, etc.

In a reforming furnace which has both a radiant section and a convection section, it is desirable to maintain a desired excess oxygen content in the combustion gases withdrawn from the radiant section and in the stack gas in order to substantially maximize the combustion of fuel in the radiant section and the combustion section. It is also desirable to maintain a desired temperature for the synthesis gas since this temperature is a major factor in the composition of the synthesis gas. However, maintenance of a desired synthesis gas temperature should not be allowed to cause process constraints, such as a maximum tube skin temperature for the radiant section, to be violated. Also, for the sake of safety and efficiency, care should be taken that a process upset cannot cause a deficiency in the air supplied to the radiant section and convection section.

It is thus an object of this invention to provide a control system for a reforming furnace having both a radiant section and a convection section in which the above-described criteria are met so as to safely, substantially maximize the efficiency and performance of the reforming furnace.

In accordance with the present invention, method and apparatus is provided whereby the fuel flow rate to the radiant section is manipulated so as to maintain a desired synthesis gas temperature unless such maintenance would result in the violation of a process constraint. The air flow rate to the radiant section is manipulated so as to maintain a desired air to fuel ratio with an analysis of the excess oxygen in the combustion gases withdrawn from the radiant section being utilized to trim the air flow rate so as to ensure that a desired excess oxygen concentration is maintained. For the convection section, the flow rate of fuel is manipulated so as to maintain the desired boiler feed water temperature and the flow rate of air to the convection section is again manipulated so as to maintain the desired air to fuel ratio. An analysis of the stack gas is utilized to trim the air flow rate so as to ensure that a desired excess oxygen concentration in the stack gas is maintained. An override of this control system which will insure that the fuel air mixture for the radiant section and convection section are always air rich may also be utilized if desired. The above, briefly described control, substantially maximizes the efficiency of the reforming furnace while still maintaining a desired synthesis gas temperature. Also, if the override control is employed, air rich fuel and air mixtures for the radiant section and convection section are insured.

Figure 2:
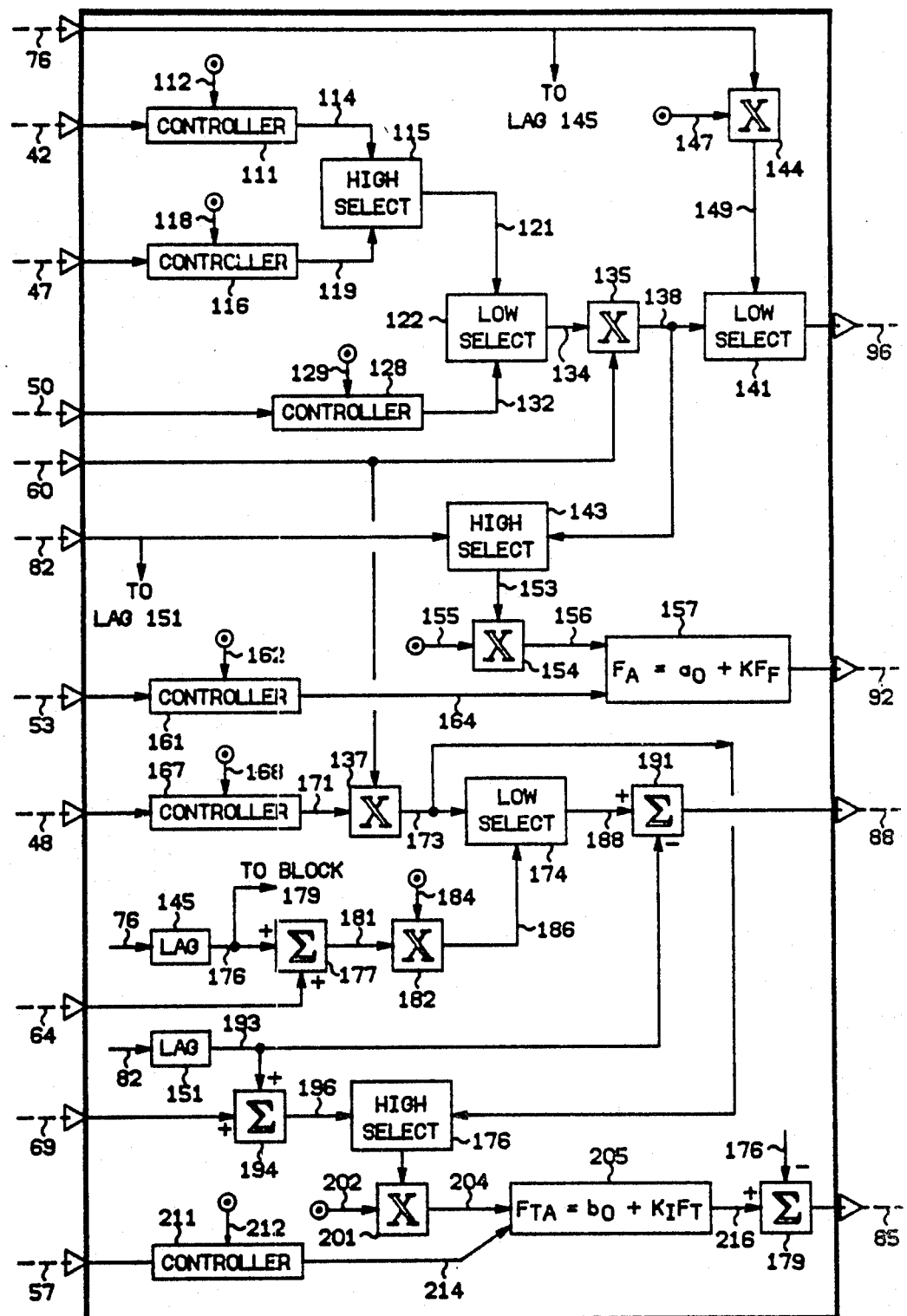

Other objects and advantages of the invention will be apparent from the foregoing brief description of the invention and the claims as well as the detailed description of the drawings which are briefly described as follows:

FIG. 1 is a diagrammatic illustration of a reforming furnace having both a radiant section and a convection section and the associated control system of the present invention; and FIG. 2 is a flow diagram of the logic utilized to derive the control signals illustrated in FIG. 1 based on the process measurements illustrated in FIG. 1.

The invention is illustrated in terms of a reforming furnace for a methanol process. However, the invention is applicable to any reforming furnace having both a radiant section and a convection section where a synthesis gas is produced in the radiant section and at least one fluid stream used in the process, such as boiler feed water, is heated in the convection section.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signals based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integralderivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, the hydrocarbon containing feed gas, which will generally range from methane to naphtha, flowing through conduit means 11 is passed through the convection section of the reforming furnace 12 to preheat the feed gas. The feed gas withdrawn from the convection section of the reforming furnace 12 is passed through conduit means 14 to the radiant section of the reforming furnace 12. The feed gas will flow through a plurality of cracking tubes, which are represented by the cracking tube 15, and will be removed from the radiant section of the cracking furnace 12 through conduit means 16. Generally, the synthesis gas flowing through conduit means 16 will contain major concentrations of hydrogen, carbon monoxide and carbon dioxide which is required for the methanol process.

Water is provided through conduit means 17 to the convection section of the reforming furnace 12. This water is converted into steam and is removed from the convection section through conduit means 19. The steam flowing through conduit means 19 will generally be utilized to supply heat to various parts of the methanol process.

Boiler feed water is provided to the convection section of the reforming furnace 12 through conduit means 18. This boiler feed water is preheated in the convection section (not generally converted to steam) and is removed from the convection section through conduit means 21. The boiler feed water flowing through conduit means 21 would generally be provided to the boiler associated with the methanol process.

Air flowing through conduit means 23 is passed through the convection section of the reforming furnace 12. The air is preheated and removed through conduit means 25. The preheated air is provided to the burners associated with the convection section of the reforming furnace 12 through the combination of conduit means 25 and 26 (auxiliary air). The preheated air is provided to the burners associated with the radiant section of the reforming furnace 12 through the combination of conduit means 25 and 28 (primary air).

A primary fuel is provided to the burners associated with the radiant section of the reforming furnace 12 through conduit means 31. In like manner, an auxiliary fuel is provided to the burners associated with the convection section of the reforming furnace 12 to conduit means 33. In general, the primary fuel flowing through conduit means 31 will be the same as the auxiliary fuel flowing through conduit means 33.

The specific manner in which the reforming furnace described to this point is controlled is as follows:

Temperature transducer 41 in combination with a temperature sensing device such as a thermocouple, which is operably located in conduit means 16, provides an output signal 42 which is representative of the actual temperature of the synthesis gas flowing through conduit means 16. Signal 42 is provided from the temperature transducer 41 as an input to computer 100.

In like manner, temperature transducer 44 and temperature transducer 45 provide output signals 47 and 48 which are representative of the actual temperature of the steam flowing through conduit means 19 and the actual temperature of the boiler feed water flowing through conduit means 21 respectively. Signals 47 and 48 are also provided as inputs to computer 100.

Analyzer transducer 51 is preferably a chromatographic analyzer such as the Model 102 Process Chromatograph manufactured by Applied Automation, Inc. A sample of the combustion gases removed from the radiant section of the reforming furnace 12 is provided to the analyzer transducer 51 through conduit means 52. In response to such sample, the analyzer transducer 51 provides an output signal 53 which is representative of the actual oxygen concentration (excess oxygen) in the combustion gases removed from the radiant section of the reforming furnace 12. Signal 53 is provided from the analyzer transducer 51 as an input to computer 100.

In like manner, the analyzer transducer 54, which will generally be of the same type as the analyzer transducer 51, is provided a sample of the stack gases through conduit means 56. In response to such sample, the analyzer transducer 54 provides an output signal 57 which is representative of the actual oxygen concentration in the stack gas (excess oxygen). Signal 57 is provided from the analyzer transducer 54 as an input to computer 100.

Flow transducer 58 in combination with the flow sensor 59, which is operably located in conduit means 11, provides an output signal 60 which is representative of the actual flow rate of the feed gas through conduit means 11. Signal 60 is provided from the flow transducer 58 as an input to computer 100.

Flow transducer 61 in combination with the flow sensor 62, which is operably located in conduit means 26, provides an output signal 64 which is representative of the actual flow rate of the auxiliary air through conduit means 26. Signal 64 is provided from the flow transducer 61 as the process variable input to the flow controller 65 and is also provided as an input to computer 100.

Flow transducer 67 in combination with the flow sensor 68, which is operably located in conduit means 33, provides an output signal 69 which is representative of the actual flow rate of the auxiliary fuel through conduit means 68. Signal 69 is provided from the flow transducer 67 as the process variable input through the flow controller 71 and is also provided as an input to computer 100.

Flow transducer 74 in combination with the flow sensor 75, which is operably located in conduit means 28, provides an output signal 76, which is representative of the actual flow rate of the primary air through conduit means 28. Signal 76 is provided from the flow transducer 74 as the process variable input to the flow controller 78 and is also provided as an input to computer 100.

Flow transducer 81 in combination with the flow sensor 82, which is operably located in conduit means 31, provides an output signal 84 which is representative of the actual flow rate of primary fuel through conduit means 31. Signal 84 is provided from the flow transducer 81 as the process variable input to the flow controller 83 and is also provided as an input to computer 100.

The infrared pirometer 49 provides an output signal 50 which is representative of the actual tube skin temperature for the cracking tubes represented by the cracking tube 15. A suitable infrared pirometer which may be utilized is the SECO/PROBEYE ®, by Standard Equipment Co., Milwaukee, WI 53224. Signal 50 is provided from the infrared pirometer 41 as an input to computer 100.

It is noted that other techniques such as models or estimating the tube skin temperature based on the temperature of the synthesis gas could be utilized to establish the actual tube skin temperature if desired.

In response to the described process measurements and in response to set points and constants which will be described hereinafter, four control signals are generated by the computer 100. These control signals are representative of the desired air flow rate through conduit means 25 and 28, the desired auxiliary fuel flow rate through conduit means 33 and the desired flow rate of the primary fuel through conduit means 31. These signals are utilized to control the reforming furnace as will be described more fully hereinafter so as to accomplish the objectives of the present invention.

Signal 85, which is representative of the desired flow rate of the auxiliary air through conduit means 26, is provided from computer 100 as the set point input to the flow controller 65. In response to signals 64 and 85, the flow controller 65 provides an output signal 86 which is responsive to the difference between signals 64 and 85. Signal 86 is scaled so as to be representative of the position of the control valve 87, which is operably located in conduit means 26, required to maintain the actual flow rate of the auxiliary air through conduit means 26 substantially equal to the desired flow rate represented by signal 85. Signal 86 is provided from the flow controller 65 as the control signal for the control valve 87 and the control valve 87 is manipulated in response thereto.

Signal 88, which is representative of the desired flow rate of auxiliary fuel through conduit means 33, is provided from the computer 100 as the set point input to the flow controller 71. In response to signals 88 and 69, the flow controller 71 provides an output signal 89 which is responsive to the difference between signals 69 and 88. Signal 89 is scaled so as to be representative of the position of the control valve 91, which is operably located in conduit means 33, required to maintain the actual flow rate of the auxiliary fuel substantially equal to the desired flow rate represented by signal 88. Signal 89 is provided from the flow controller 71 as a control signal to the control valve 91 and the control valve 91 is manipulated in response thereto.

Signal 92, which is representative of the desired flow rate of the primary air through conduit means 28, is provided from computer 100 as the set point input to the flow controller 78. In response to signals 76 and 92, the flow controller 78 provides an output signal 93 which is responsive to the difference between signals 76 and 92. Signal 93 is scaled so as to be representative of the position of the control valve 94, which is operably located in conduit means 28, required to maintain the actual flow rate of primary air through conduit means 28 substantially equal to the desired flow rate represented by signal 92. Signal 93 is provided from the flow controller 78 as the control signal for the control valve 94 and the control valve 94 is manipulated in response thereto.

Signal 96, which is representative of the desired flow rate of the primary fuel through conduit means 31, is provided from the computer 100 as the set point input to the flow controller 83. In response to signals 84 and 96, the flow controller 83 provides an output signal 97 which is responsive to the difference between signals 84 and 96. Signal 97 is scaled so as to be representative of the position of the control valve 98, which is operably located in conduit means 31, required to maintain the actual flow rate of the primary fuel substantially equal to the desired flow rate represented by signal 96. Signal 97 is provided from the flow controller 83 as a control signal to the control valve 98 and the control valve 98 is manipulated in response thereto.

The manner in which control signals 85, 88, 92 and 96 are established is illustrated in FIG. 2 and is as follows:

Referring now to FIG. 2, signal 42, which is representative of the actual temperature of the synthesis gas, is provided as the process variable input to the controller block 111. Signal 112, which is representative of the desired temperature of the synthesis gas, is provided as the set point input to the controller block 111. In response to signals 42 and 112, the controller block 111 provides an output signal 114 which is responsive to the difference between signals 42 and 112. Signal 114 is scaled so as to be representative of the primary fuel flow rate to feed flow rate ratio required to maintain the actual temperature of the synthesis gas substantially equal to the desired temperature represented by signal 112. Signal 114 is provided as a first input to the high select block 115.

Signal 47, which is representative of the actual temperature of the steam flowing through conduit means 19, is provided as the set point input to the controller block 116. The controller block 116 is also provided with a set point signal 118 which is representative of a low limit temperature for the steam flowing through conduit means 19. In response to signals 47 and 118, the controller block 116 provides an output signal 119 which is representative of the primary fuel flow rate to feed flow rate ratio required to maintain the actual steam temperature substantially equal to the low limit for the steam temperature. Signal 119 is provided as a second input to the high select block 115.

In response to signals 114 and 119, the high select block 115 establishes signal 121 which is equal to the one of signals 114 and 119 which is representative of the highest primary fuel flow rate to feed flow rate ratio. Signal 121 is provided from the high select block 115 as a first input to the low select block 122.

It is noted that in those processes in which the convection section of the reforming furnace is not utilized to produce steam that signal 114 could be provided directly to the low select block 122. Also, in some circumstances, even if steam is being produced in the convection section, it may not be necessary or desired to maintain a low limit temperature for the steam and under these circumstances signal 114 may again be supplied directly to the low select block 122.

Signal 50, which is representative of the actual tube skin temperature, is provided as the process variable input to the controller block 128. The controller block 128 is also provided with a set point signal 129 which is representative of the maximum desired tube skin temperature. The maximum desired tube skin temperature will generally be determined by metallurgical considerations.

In response to signals 50 and 129, the controller block 128 provides an output signal 132 which is responsive to the difference between signals 50 and 129. Signal 132 is scaled so as to be representative of the primary fuel flow rate to feed flow rate required to maintain the actual tube skin temperature substantially equal to the maximum desired tube skin temperature. Signal 132 is provided from the controller block 128 as a second input to the low select block 122.

In response to signals 121 and 132, the low select block 122 provides an output signal 134 which is equal to the one of signals of 121 and 132 which is representative of the lowest primary fuel flow rate to feed flow rate ratio. Signal 134 is provided from the low select block as a first input to the multiplying block 135.

Under most operating conditions, signal 134 will be equal to signal 114. Thus, the reforming furnace will be controlled so as to maintain a desired temperature for the synthesis gas. Only in those circumstances when control so as to maintain a desired temperature of the synthesis gas would result in a steam temperature below the low limit for the steam temperature or a tube skin temperature higher than a high limit will control based on the desired synthesis gas temperature be overridden by either signal 119 or signal 132. Thus, control of the synthesis gas temperature is provided while not allowing process constraints to be violated.

Signal 60, which is representative of the actual flow rate of the feed gas through conduit means 11, is provided as a second input to the multiplying block 135 and as a first input to the multiplying block 137. Signal 134 is multiplied by signal 60 to establish signal 138 which is representative of the desired flow rate of primary fuel to the radiant section. Signal 138 is provided as a first input to the low select block 141 and is also provided as a first input to the high select block 143.

Signal 76, which is representative of the flow rate of air to the radiant section through conduit means 28, is provided as a first input to the multiplying block 144 and is also provided as an input to the lag block 145. The multiplying block 144 is also provided with signal 147 which is a constant representative of a desired primary fuel flow rate to primary air flow rate ratio. Signal 76 is multiplied by signal 147 to establish signal 149 which is representative of the primary fuel flow rate required to maintain the ratio represented by signal 147. Signal 149 is provided as a second input to the low select block 141.

In response to signals 138 and 149, the low select block 141 establishes signal 96 which is representative of the desired primary fuel flow rate to the radiant section of the reforming furnace 12. Signal 96 is provided as an output from computer 100 and is utilized as has been previously described.

It is noted that the control logic utilized to generate signal 149 is provided to insure that primary air flow rate always increases before the primary fuel flow rate increases or that the primary fuel flow rate decreases before primary air flow rate decreases. This control logic is preferred but could be eliminated if desired. If eliminated, signal 138 would be provided directly as the control signal 96.

Signal 82, which is representative of the actual flow rate of the primary fuel through conduit means 31 to the radiant section of the reformer 12, is provided as a second input to the high select block 143 and is also provided as an input to the lag block 151. In response to signals 138 and 82, the high select block 143 establishes signal 153 which is equal to the one of signals 138 and 82 which is representative of the highest primary fuel flow rate. Signal 153 is provided from the high select block 143 as an input to the multiplying block 154.

The primary fuel flow rate signal 82 is utilized to again insure that the primary air flow rate increases before the primary fuel flow rate increases and the primary fuel flow rate decreases before the primary air flow rate decreases. Again, if this control is not desired, signal 138 could be supplied directly to the multiplying block 154.

Signal 155, which is representative of a desired primary air flow rate to primary fuel flow rate ratio is provided as a second input to the multiplying block 154. Signal 153 is multiplied by signal 155 to establish signal 156 which is representative of the flow rate of the primary air through conduit means 28 required to maintain the actual primary air flow rate to primary fuel flow rate ratio substantially equal to the desired ratio represented by signal 155. Signal 156 is provided from the multiplying block 154 as an input to block 157 which is utilized to calculate the desired air flow rate. Signal 156 is representative of $KF_f$ in the equation illustrated in block 157.

Signal 53, which is representative of the actual oxygen concentration in the combustion gases withdrawn from the radiant section of the reformer 12, is provided as the process variable input to the controller block 161. The controller block 161 is also provided with a set point signal 162 which is representative of the desired oxygen concentration. In response to signals 53 and 162, the controller block 161 provides an output signal 164 which is responsive to the difference between signals 53 and 162. Signal 164 is scaled so as to be representative of any change in the flow rate represented by signal 156 required to maintain the actual oxygen concentration in the combustion gases withdrawn from the radiant section substantially equal to the desired concentration represented by signal 162. Signal 164 is provided from the controller block 161 as an input to block 157 and is representative of $a_0$.

In response to signals 156 and 164 block 157 provides an output signal 92 which is representative of the desired flow rate of the primary air to the radiant section of the reformer 12. As is indicated in block 157, signal 92 is the sum of signals 156 and 164. Signal 92 is provided as an output from computer 100 and is utilized as has been previously described.

It is noted, that if the ratio represented by signal 155 is a ratio which will maintain the desired oxygen concentration in the combustion gases withdrawn from the radiant section substantially equal to the desired oxygen concentration represented by signal 162, signal 164 will be essentially equal to zero. Thus, signal 164 may be considered a trim signal.

The ratio represented by signal 155 will be chosen based on operator experience and may be revised from time to time depending upon the magnitude of signal 164. That is, if signal 164 stays consistently positive or negative, then it may be desirable to change the value of signal 155.

Signal 48, which is representative of the actual temperature of the boiler feed water flowing through conduit means 21, is provided as the process variable input to the controller block 167. It is noted that any process stream flowing through the convection section of the reformer 12 could be utilized in the process control. However, since the preheating of boiler feed water is common in a methanol plant, the present invention is described in terms of control based on the temperature of the boiler feed water flowing through conduit means 21.

The controller block 167 is also provided with a set point signal 168 which is representative of the desired temperature of the boiler feed water flowing through conduit means 21. In response to signals 48 and 168, the controller 167 provides an output signal 171 which is responsive to the difference between signals 168 and 48. Signal 171 is scaled so as to be representative of the total fuel flow rate (primary fuel plus auxiliary fuel) to feed ratio required to maintain the actual temperature of the boiler feed water flowing through conduit means 21 substantially equal to the set point temperature represented by signal 168. Signal 171 is provided from the controller block 167 as a second input to the multiplying block 137.

Signal 171 is multiplied by signal 60 to establish signal 173 which is representative of the total flow rate of fuel to the reformer 12 required to maintain the actual temperature of the boiler feed water flowing through conduit means 21 substantially equal to the desired temperature. Signal 173 is provided from the multiplying block 137 as an input to the low select block 174 and also as an input to the high select block 176.

As has been previously stated, signal 76, which is representative of the flow rate of the primary air to the radiant section of the reformer 12, is provided as an input to the lag block 145. The lag block 145 may be considered a delay with a time constant equal to the time required for a change in the primary air flowing through conduit means 28 to cause a change in the convection section. Signal 176, which is essentially representative of signal 76 delayed by the time constant of the lag 145, is provided from the lag block 145 as an input to the summing block 177 and as an input to the summing block 179.

Signal 64, which is representative of the actual flow rate of the auxiliary air flowing through conduit means 28, is provided as a second input to the summing block 177. Signals 64 and 176 are summed to establish signal 181 which is representative of the total flow rate of air to the reformer 12. Signal 181 is provided from the summing block 177 as a first input to the multiplying block 182.

The multiplying block 182 is also provided with signal 184 which is representative of the desired total air flow rate to total fuel flow rate ratio. Signal 181 is multiplied by signal 184 to establish signal 186 which is representative of the total flow rate of fuel to the reformer 12 required to maintain the ratio represented by signal 184. Signal 186 is provided from the multiplying block 182 as an input to the low select block 174.

In response to signals 173 and 186, the low select block 174 provides an output signal 188 which is equal to the one of signals 173 and 186 which is representative of the lowest total fuel flow rate. Signal 188 is provided from the low select block 174 to the minuend input of the summing block 191.

The logic utilized to generate signal 186 is similar to the logic utilized to generate 149 and accomplishes the same purpose. Again, this logic could be omitted if desired and signal 173 supplied directly to the summing block 191.

As has been previously stated, signal 82, which is representative of the actual flow rate of the primary fuel to the radiant section of the reformer 12 is provided as an input to the lag block 151. The time constant for the lag block 151 is determined by the time required for a change in the primary fuel flow rate to the radiant section of the reformer 12 to cause a change in the convection section. Signal 193, which is representative of signal 182 delayed by the time constant of the lag block 151, is provided from the lag block 151 to the subtrahend input of the summing block 191 and as an input to the summing block 194.

Signal 193 is subtracted from signal 188 to establish signal 88 which is representative of the desired flow rate of the auxiliary fuel through conduit means 33. Signal 88 is provided as an output from computer 100 and is utilized as has been previously described.

Signal 69, which is representative of the actual flow rate of the auxiliary fuel through conduit means 33 is provided as a second input to the summing block 194. Signal 69 is summed with signal 193 to establish signal 196 which is representative of the total flow rate of fuel to the reformer 12. Signal 196 is provided from the summing block 194 as a second input to the high select block 176.

In response to signals 173 and 196, the high select block 176 provides an output signal 198 which is equal to the one of signals 173 and 196 which is representative of the highest total fuel flow rate to the reformer 12. Signal 198 is provided from the high select block 176 as a first input to the multiplying block 201.

The use of signal 196 serves the same basic function as the use of signal 82 in conjunction with the high select 143. Again, if it is desired to omit this function, the generation of signal 196 may be deleted and signal 173 supplied directly to the multiplying block 201.

Signal 202, which is representative of a desired total air flow rate to total fuel flow ratio, is provided as a second input to the multiplying block 201. Signal 198 is multiplied by signal 202 to establish signal 204 which is representative of the total flow rate of air to the reformer 12 required to maintain the ratio represented by signal 202. Signal 204 is provided from the multiplying block 201 as an input to the block 205 and is representative of $K_1 F_T$ illustrated in the equation of block 205.

Signal 57, which is representative of the actual oxygen concentration in the stack gas, is provided as the process variable input to the controller block 211. The controller block 211 is also provided with a set point signal 212 which is representative of the desired oxygen concentration in the stack gas. In response to signals 57 and 212, the controller block 211 provides an output signal 214 which is reponsive to the difference between signals 57 and 212. Signal 214 is scaled so as to be representative of any change in the total air flow rate represented by signal 204 required to maintain the actual oxygen concentration in the stack gas substantially equal to the desired concentration represented by signal 212. As was the case with signal 164, signal 214 may be considered a trim signal. Also, signal 202 may be changed as previously described for signal 155.

Signal 214 is provided from the controller block 211 as an input to block 205 and is representative of $b_0$.

Signals 204 and 214 are summed in block 205 to establish signal 216 which is representative of the desired total flow rate of air to the reformer 12. Signal 216 is provided from the block 205 to the minuend input of the summing block 179.

Signal 176 is subtracted from signal 216 to establish signal 85 which is representative of the desired flow rate of auxiliary air to the convection section of the reformer 12. Signal 85 is provided as an output from computer 100 and is utilized as has been previously described.

The invention has been described in terms of a preferred embodiment as illustrated in FIGS. 1 and 2. Specific components which can be used in the practice of the invention as illustrated in FIG. 1 such as flow sensors 59, 62, 68, 75 and 82; flow transducers 58, 61, 67, 74 and 81; flow controllers 65, 71, 78 and 83; temperature transducers 41, 44 and 45; and control valves 87, 91, 94 and 98 are each well known, commercially available control components such as are described at length in Perry's Chemical Engineers Handbook, 4th Ed., Chapter 22, McGraw-Hill.

Additional equipment such as pumps, additional heat exchangers, additional control components, etc. which would typically be associated with a reforming furnace have not been illustrated since these additional components play no part in the description of the present invention.

While the invention has been described in terms of the presently preferred embodiment, reasonable variations and modifications are possible by those skilled in the art and such modifications and variations are within the scope of the described invention and the appended claims.

That which is claimed is:

1. Apparatus comprising:
    a reforming furnace having a radiant section, a convection section and a stack, wherein said radiant section contains cracking tubes;
    means for supplying a hydrocarbon-containing feed gas to the cracking tubes contained in the radiant section of said reforming furnace;
    means for withdrawing a synthesis gas formed by passing said hydrocarbon-containing feed gas through said cracking tubes from said reforming furnace;
    means for passing a fluid stream through said convection section, wherein said fluid stream is heated by passing through said convection section;
    means for supplying a primary fuel stream to said radiant section;
    means for supplying a primary air stream to said radiant section, wherein the combustion of said primary fuel stream mixed with said primary air stream provides heat to the cracking tubes in said radiant section and wherein the combustion gases from the combustion of said primary fuel stream mixed with said primary air stream pass through said convection section to said stack;
    means for supplying an auxiliary fuel stream to said convection section;
    means for supplying an auxiliary air stream to said convection section, wherein the combustion of said auxiliary fuel stream mixed with said auxiliary air stream provides heat to said convection section and wherein the combustion gases from the combustion of said auxiliary fuel stream mixed with said auxiliary air stream pass through said stack;
    means for establishing a first signal representative of the actual temperature of said synthesis gas;
    means for establishing a second signal representative of the desired temperature of said synthesis gas;
    means for comparing said first signal and said second signal and for establishing a third signal which is responsive to the difference between said first signal and said second signal, wherein said third signal is scaled so as to be representative of the primary fuel flow rate to hydrocarbon-containing feed stream flow rate ratio required to maintain the actual synthesis gas temperature substantially equal to the desired temperature represented by said second signal;
    means for establishing a fourth signal representative of the actual temperature of said cracking tubes;
    means for establishing a fifth signal representative of the maximum desired temperature of said cracking tubes;
    means for comparing said fourth signal and said fifth signal and for establishing a sixth signal which is responsive to the difference between said fourth signal and said fifth signal, wherein said sixth signal is scaled so as to be representative of the primary fuel flow rate by hydrocarbon-containing feed stream flow rate ratio required to maintain the actual tube temperature substantially equal to the maximum desired temperature represented by said fifth signal;

a first low select means;

means for providing said third signal and said sixth signal to said first low select means, wherein said first low select means establishes a seventh signal which is equal to the one of said third and sixth signals which is representative of the lowest primary fuel flow rate to hydrocarbon-containing feed stream flow rate ratio;

means for establishing an eighth signal, which is representative of the desired flow rate of said primary fuel stream, in response to said seventh signal;

means for manipulating the flow rate of said primary fuel stream in response to said eighth signal;

means for establishing a ninth signal, which is representative of the desired flow rate of said primary air stream, in response to said seventh signal;

means for manipulating the flow rate of said primary air stream in response to said ninth signal;

means for establishing a tenth signal representative of the actual temperature of said fluid stream flowing from said convection section;

means for establishing an eleventh signal representative of the desired temperature of said process stream;

means for comparing said tenth signal and said eleventh signal and for establishing a twelfth signal which is responsive to the difference between said tenth signal and said eleventh signal, wherein said twelfth signal is scaled so as to be representative of the total fuel flow rate (said primary fuel stream plus said auxiliary fuel stream) to said hydrocarbon-containing feed stream flow rate ratio required to maintain the actual temperature of said fluid stream substantially equal to the desired temperature represented by said twelfth signal;

means for establishing a thirteenth signal, which is representative of the desired flow rate of said auxiliary fuel, in response to said twelfth signal;

means for manipulating the flow rate of said auxiliary fuel in response to said thirteenth signal;

means for establishing a fourteenth signal representative of the desired flow rate of said auxiliary air in response to said twelfth signal; and means for manipulating the flow rate of said auxiliary air in response to said fourteenth signal.

2. Apparatus in accordance with claim 1 wherein said means for establishing said eighth signal in response to said seventh signal comprises:

means for establishing a fifteenth signal representative of the actual flow rate of said hydrocarbon-containing feed stream; and means for multiplying said seventh signal by said fifteenth signal to establish said eighth signal.

3. Apparatus in accordance with claim 1 wherein said means for establishing said eighth signal in response to said seventh signal comprises:

means for establishing a fifteenth signal representative of the actual flow rate of said hydrocarbon-containing feed stream;

means for multiplying said seventh signal by said fifteenth signal to establish a sixteenth signal which is representative of the flow rate of said primary fuel stream required to maintain the ratio represented by said seventh signal;

means for establishing a seventeenth signal representative of the actual flow rate of said primary air stream;

means for establishing an eighteenth signal representative of the desired flow rate of said primary fuel stream to the flow rate of said primary air stream ratio;

means for multiplying said seventeenth signal by said eighteenth signal to establish a nineteenth signal which is representative of the flow rate of said primary fuel stream required to maintain the ratio represented by said eighteenth signal;

a second low select means; and means for providing said sixteenth signal and said nineteenth signal to said second low select means, wherein said second low select means establishes said eighth signal which is equal to the one of said sixteenth and nineteenth signals which is representative of the lowest flow rate of said primary fuel stream.

4. Apparatus in accordance with claim 3 additionally comprising:

means for passing water through said convection section, wherein said water is converted to steam in said convection section;

means for establishing a twentieth signal representative of the actual temperature of said steam;

means for establishing a twenty-first signal representative of the minimum desired temperature of said steam;

means for comparing said twentieth signal and said twenty-first signal and for establishing a twenty-second signal which is responsive to the difference between said twentieth signal and said twenty-first signal, wherein said twenty-second signal is scaled so as to be representative of the ratio of the flow rate of said primary fuel stream to the flow rate of said hydrocarbon-containing feed stream required to maintain the actual steam temperature substantially equal to the minimum desired steam temperature represented by said twenty-first signal;

a high select means; and means for providing said third signal and said twenty-second signal to said high select means, wherein said high select means establishes a twenty-third signal which is equal to the one of said third and twenty-second signals which is representative of the highest flow rate of said primary fuel stream to the flow rate of said hydrocarbon-containing feed stream ratio, wherein said twenty-third signal is supplied to said first low select means in place of said third signal and wherein said seventh signal is equal to the one of said sixth and twenty-third signals which is representative of the lowest flow rate of said primary fuel stream to the flow rate of said hydrocarbon-containing feed stream ratio.

5. Apparatus in accordance with claim 1 wherein said means for establishing said thirteenth signal in response to said twelfth signal comprises:

means for establishing a fifteenth signal representative of the actual flow rate of said hydrocarbon-containing feed stream;

means for multiplying said twelfth signal by said fifteenth signal to establish a sixteenth signal which is representative of the total desired flow rate of said primary fuel stream and said auxiliary fuel stream;

means for establishing a seventeenth signal representative of the actual flow rate of said primary fuel stream delayed by a time constant substantially equal to the time required for a change in the flow rate of said primary fuel stream to cause a change in said convection section; and means for subtracting said seventeenth signal from said sixteenth signal to establish said thirteenth signal.

6. Apparatus in accordance with claim 1 wherein said means for establishing said thirteenth signal in response to said twelfth signal comprises:

means for establishing a fifteenth signal representative of the actual flow rate of said hydrocarbon-containing feed stream;

means for multiplying said twelfth signal by said fifteenth signal to establish a sixteenth signal which is representative of the total flow rate of said primary fuel stream and said auxiliary fuel stream required to maintain the ratio represented by said twelfth signal;

means for establishing a seventeenth signal representative of the actual flow rate of said primary air stream delayed by a time constant representative of the time required for a change in the flow rate of said primary air stream to cause a change in said convection section;

means for establishing an eighteenth signal representative of the actual flow rate of said auxiliary air stream;

means for summing said seventeenth signal and said eighteenth signal to establish a nineteenth signal representative of the total flow rate of air to said reforming furnace;

means for establishing a twentieth signal representative of a desired total flow rate of fuel to said reforming furnace to total flow rate of air to said reforming furnace ratio;

means for multiplying said nineteenth signal by said twentieth signal to establish a twenty-first signal which is representative of the total flow rate of fuel to said reforming furnace required to maintain the ratio represented by said twentieth signal;

a second low select means;

means for providing said sixteenth signal and said twenty-first signal to said second low select means, wherein said second low select means establishes a twenty-second signal which is equal to the one of said sixteenth and twenty-first signals which is representative of the lowest total fuel flow rate to said reforming furnace;

means for establishing a twenty-third signal representative of the actual flow rate of said primary fuel stream delayed by a time constant substantially equal to the time required for a change in the flow rate of said primary fuel stream to cause a change in said convection section; and means for subtracting said twenty-third signal from said twenty-second signal to establish said thirteenth signal.

7. Apparatus in accordance with claim 1 wherein said means for establishing said ninth signal in response to said seventh signal comprises:

means for establishing a fifteenth signal representative of the actual flow rate of said hydrocarbon-containing feed stream;

means for multiplying said seventh signal by said fifteenth signal to establish a sixteenth signal which is representative of the flow rate of said primary fuel stream required to maintain the ratio represented by said seventh signal;

means for establishing a seventeenth signal representative of a desired primary air flow rate to primary fuel flow rate ratio;

means for multiplying said sixteenth signal by said seventeenth signal to establish an eighteenth signal representative of a desired primary air flow rate;

means for establishing a nineteenth signal representative of the actual oxygen concentration in the combustion gases withdrawn from said radiant section;

means for establishing a twentieth signal representative of the desired oxygen concentration in the combustion gases withdrawn from said radiant section;

means for comparing said nineteenth signal and said twentieth signal and for establishing a twenty-first signal which is responsive to the difference between said nineteenth signal and said twentieth signal, wherein said twenty-first signal is scaled so as to be representative of any change in the primary air flow rate represented by said eighteenth signal required to maintain the actual oxygen concentration in the combustion gases withdrawn from said radiant section substantially equal to the desired concentration represented by said twentieth signal; and means for summing said eighteenth signal and said twenty-first signal to establish said ninth signal.

8. Apparatus in accordance with claim 1 wherein said means for establishing said ninth signal in response to said seventh signal comprises:

means for establishing a fifteenth signal representative of the actual flow rate of said hydrocarbon-containing feed stream;

means for multiplying said seventh signal by said fifteenth signal to establish a sixteenth signal which is representative of the flow rate of said primary fuel stream required to maintain the ratio represented by said seventh signal;

means for establishing a seventeenth signal representative of the actual flow rate of said primary fuel stream;

a high select means;

means for providing said sixteenth signal and said seventeenth signal to said high select means, wherein said high select means establishes an eighteenth signal which is equal to the one of said sixteenth and seventeenth signals which is representative of the highest primary fuel flow rate;

means for establishing a nineteenth signal representative of a desired primary air flow rate to primary fuel flow rate ratio;

means for multiplying said eighteenth signal by said nineteenth signal to establish a twentieth signal representative of a desired primary air flow rate;

means for establishing a twenty-first signal representative of the actual oxygen concentration in the combustion gases withdrawn from said radiant section;

means for establishing a twenty-second signal representative of the desired oxygen concentration in the combustion gases withdrawn from said radiant section;

means for comparing said twenty-first signal and said twenty-second signal and for establishing a twenty-third signal which is responsive to the difference between said twenty-first signal and said twenty-second signal, wherein said twenty-third signal is scaled so as to be representative of any change in the primary air flow rate represented by said twentieth signal required to maintain the actual oxygen concentration in the combustion gases withdrawn from said radiant section substantially equal to the desired concentration represented by said twenty-second signal; and means for summing said twentieth signal and said twenty-third signal to establish said ninth signal.

9. Apparatus in accordance with claim 1 wherein said means for establishing said fourteenth signal in response to said twelfth signal comprises:

means for establishing a fifteenth signal representative of the actual flow rate of said hydrocarbon-containing feed stream;

means for multiplying said twelfth signal by said fifteenth signal to establish a sixteenth signal representative of the total fuel flow rate to said reforming furnace required to maintain the ratio represented by said twelfth signal;

means for establishing a seventeenth signal representative of a desired total flow rate of air to said reforming furnace to total flow rate of fuel to said reforming furnace ratio;

means for multiplying said sixteenth signal by said seventeenth signal to establish an eighteenth signal representative of the desired total flow rate of air to said reforming furnace;

means for establishing a nineteenth signal representative of the actual oxygen concentration in the effluent gases passing through said stack;

means for establishing a twentieth signal representative of the desired concentration of oxygen in the effluent gases passing through said stack;

means for comparing said nineteenth signal and said twentieth signal and for establishing a twenty-first signal which is responsive to the difference between said nineteenth signal and said twentieth signal, wherein said twenty-first signal is scaled so as to be representative of any changes in the total air flow rate represented by said eighteenth signal required to maintain the actual oxygen concentration in the combustion gases passing through said stack substantially equal to the desired concentration represented by said twentieth signal;

means for summing said eighteenth signal and said twenty-first signal to establish a twenty-second signal which is representative of the desired total flow rate of air to said reforming furnace;

means for establishing a twenty-third signal which is representative of the actual flow rate of said primary air stream delayed by a time constant representative of the time required for a change in the flow rate of said primary air stream to cause a change in said convection section; and means for subtracting said twenty-third signal from said twenty-second signal to establish said fourteenth signal.

10. Apparatus in accordance with claim 1 wherein said means for establishing said fourteenth signal in response to said twelfth signal comprises:

means for establishing a fifteenth signal representative of the actual flow rate of said hydrocarbon-containing feed stream;

means for multiplying said twelfth signal by said fifteenth signal to establish a sixteenth signal representative of the total fuel flow rate to said reforming furnace required to maintain the ratio represented by said twelfth signal;

means for establishing a seventeenth signal representative of the actual flow rate of said primary fuel stream delayed by a time constant representative of the time required for a change in the flow rate of said primary fuel stream to cause a change in said convection section;

means for establishing an eighteenth signal representative of the actual flow rate of said auxiliary fuel stream;

means for summing said seventeenth signal and said eighteenth signal to establish a nineteenth signal representative of the total flow rate of fuel to said reforming furnace;

a high select means;

means for providing said sixteenth signal and said nineteenth signal to said high select means, wherein said high select means establishes a twentieth signal which is equal to the one of said sixteenth and nineteenth signals which is representative of the highest total fuel flow rate to said reforming furnace;

means for establishing a twenty-first signal representative of a desired total flow rate of air to said reforming furnace to total flow rate of fuel to said reforming furnace ratio;

means for multiplying said twentieth signal by said twenty-first signal to establish a twenty-second signal representative of the desired total flow rate of air to said reforming furnace;

means for establishing a twenty-third signal representative of the actual oxygen concentration in the effluent gases passing through said stack;

means for establishing a twenty-fourth signal representative of the desired concentration of oxygen in the effluent gases passing through said stack;

means for comparing said twenty-third signal and said twenty-fourth signal and for establishing a twenty-fifth signal which is responsive to the difference between said twenty-third signal and said twenty-fourth signal, wherein said twenty-fifth signal is scaled so as to be representative of any changes in the total air flow rate represented by said twenty-second signal required to maintain the actual oxygen concentration in the effluent gases passing through said stack substantially equal to the desired concentration represented by said twenty-fourth signal;

means for summing said twenty-second signal and said twenty-fifth signal to establish a twenty-sixth signal which is representative of the desired total flow rate of air to said reforming furnace;

means for establishing a twenty-seventh signal which is representative of the actual flow rate of said primary air stream delayed by a time constant representative of the time required for a change in the flow rate of said primary air stream to cause a change in said convection section; and means for subtracting said twenty-seventh signal from said twenty-sixth signal to establish said fourteenth signal.

11. A method for controlling a reforming furnace having a radiant section containing cracking tubes, a convection section and a stack, wherein a hydrocarbon-containing feed gas is passed through said cracking tubes to form a synthesis gas, wherein a fluid stream is passed through said convection section to heat said fluid stream; wherein a primary fuel stream and a primary air stream are combusted in said radiant section to supply heat to said cracking tubes, wherein the combustion gases from the combustion of said primary fuel stream and said primary air stream pass though said convection section to said stack; wherein an auxiliary fuel stream and auxiliary air stream are combusted in said convection section to supply heat to said convection section and wherein the combustion gases from the combustion of said auxiliary fuel stream and said auxiliary air stream pass through said stack, said method comprising the steps of:

establishing a first signal representative of the actual temperature of said synthesis gas;

establishing a second signal representative of the desired temperature of said synthesis gas;

comparing said first signal and said second signal and establishing a third signal which is responsive to the difference between said first signal and said second signal, wherein said third signal is scaled so as to be representative of the primary fuel flow rate to hydrocarbon-containing feed stream flow rate ratio required to maintain the actual synthesis gas temperature substantially equal to the desired temperature represented by said second signal;

establishing a fourth signal representative of the actual temperature of said cracking tubes;

establishing a fifth signal representative of the maximum desired temperature of said cracking tubes;

comparing said fourth signal and said fifth signal and establishing a sixth signal which is responsive to the difference between said fourth signal and said fifth signal, wherein said sixth signal is scaled so as to be representative of the primary fuel flow rate to hydrocarbon-containing feed stream flow rate ratio required to maintain the actual tube temperature substantially equal to the maximum desired temperature represented by said fifth signal;

establishing a seventh signal which is equal to the one of said third and sixth signals which is representative of the lowest primary fuel flow rate to hydrocarbon-containing feed stream flow rate ratio;

establishing an eighth signal, which is representative of the desired flow rate of said primary fuel stream, in response to said seventh signal;

manipulating the flow rate of said primary fuel stream in response to said eighth signal;

establishing a ninth signal, which is representative of the desired flow rate of said primary air stream, in response to said seventh signal;

manipulating the flow rate of said primary air stream in response to said ninth signal;

establishing a tenth signal representative of the actual temperature of said fluid stream flowing from said convection section;

establishing an eleventh signal representative of the desired temperature of said process stream;

comparing said tenth signal and said eleventh signal and establishing a twelfth signal which is responsive to the difference between said tenth signal and said eleventh signal, wherein said twelfth signal is scaled so as to be representative of the total fuel flow rate (said primary fuel stream plus said auxiliary fuel stream) to said hydrocarbon-containing feed stream flow rate ratio required to maintain the actual temperature of said fluid stream substantially equal to the desired temperature represented by said twelfth signal;

establishing a thirteenth signal, which is representative of the desired flow rate of said auxiliary fuel, in response to said twelfth signal;

manipulating the flow rare of said auxiliary fuel in response to said thirteenth signal;

establishing a fourteenth signal representative of the desired flow rate of said auxiliary air in response to said twelfth signal; and manipulating the flow rate of said auxiliary air in response to said fourteenth signal.

12. A method in accordance with claim 11, wherein said step of establishing said eighth signal is response to said seventh signal comprises:

establishing a fifteenth signal representative of the actual flow rate of said hydrocarbon-containing feed stream; and multiplying said seventh signal by said fifteenth signal to establish said eighth signal.

13. A method in accordance with claim 11 wherein said step of establishing said eighth signal in response to said seventh signal comprises:

establishing a fifteenth signal representative of the actual flow rate of said hydrocarbon-containing feed stream;

multiplying said seventh signal by said fifteenth signal to establish a sixteenth signal which is representative of the flow rate of said primary fuel stream required to maintain the ratio represented by said seventh signal;

establishing a seventeenth signal representative of the actual flow rate of said primary air stream;

establishing an eighteenth signal representative of the desired flow rate of said primary fuel stream to the flow rate of said primary air stream ratio;

multiplying said seventeenth signal by said eighteenth signal to establish a nineteenth signal which is representative of the flow rate of said primary fuel stream required to maintain the ratio represented by said eighteenth signal; and establishing said eighth signal which is equal to the one of said sixteenth and nineteenth signals which is representative of the lowest flow rate of said primary fuel stream.

14. A method in accordance with claim 13, additionally comprising the steps of:

passing water through said convection section, wherein said water is converted to steam in said convection section;

establishing a twentieth signal representative of the actual temperature of said steam;

establishing a twenty-first signal representative of the minimum desired temperature of said steam;

comparing said twentieth signal and said twenth-first signal and establishing a twenty-second signal which is responsive to the difference between said twentieth signal and said twenty-first signal, wherein said twenty-second signal is scaled so as to be representative of the ratio of the flow rate of said primary fuel stream to the flow rate of said hydrocarbon-containing feed stream required to maintain the actual steam temperature substantially equal to the minimum desired steam temperature represented by said twenth-first signal; and establishing a twenty-third signal which is equal to the one of said third and twenty-second signals which is representative of the highest flow rate of said primary fuel stream to the flow rate of said hydrocarbon-containing feed stream ratio, wherein said seventh signal is equal to the one of said sixth and twenty-third signals which is representative of the lowest flow rate of said primary fuel stream to the flow rate of said hydrocarbon-containing feed stream ratio.

15. A method in accordance with claim 11 wherein said step of establishing said thirteenth signal in response to said twelfth signal comprises:

establishing a fifteenth signal representative of the actual flow rate of said hydrocarbon-containing feed stream;

multiplying said twelfth signal by said fifteenth signal to establish a sixteenth signal which is representative of the total desired flow rate of said primary fuel stream and said auxiliary fuel stream;

establishing a seventeenth signal representative of the actual flow rate of said primary fuel stream delayed by a time constant substantially equal to the time required for a change in the flow rate of said primary fuel stream to cause a change in said convection section; and subtracting said seventeenth signal from said sixteenth signal to establish said thirteenth signal.

16. A method in accordance with claim 11 wherein said step of establishing said thirteenth signal in response to said twelfth signal comprises:

establishing a fifteenth signal representative of the actual flow rate of said hydrocarbon-containing feed stream;

multiplying said twelfth signal by said fifteenth signal to establish a sixteenth signal which is representative of the total flow rate of said primary fuel stream and said auxiliary fuel stream required to maintain the ratio represented by said twelfth signal;

establishing a seventeenth signal representative of the actual flow rate of said primary air stream delayed by a time constant representative of the time required for a change in the flow rate of said primary air stream to cause a change in said convection section;

establishing an eighteenth signal representative of the actual flow rate of said auxiliary air stream;

summing said seventeenth signal and said eighteenth signal to establish a nineteenth signal representative of the total flow rate of air to said reforming furnace;

establishing a twentieth signal representative of a desired total flow rate of fuel to said reforming furnace to total flow rate of air to said reforming furnace ratio;

multiplying said nineteenth signal by said twentieth signal to establish a twenty-first signal which is representative of the total flow rate of fuel to said reforming furnace required to maintain the ratio represented by said twentieth signal;

establishing a twenty-second signal which is equal to the one of said sixteenth and twenty-first signals which is representative of the lowest total fuel flow rate to said reforming furnace;

establishing a twenty-third signal representative of the actual flow rate of said primary fuel stream delayed by a time constant substantially equal to the time required for a change in the flow rate of said primary fuel stream to cause a change in said convection section; and subtracting said twenty-third signal from said twenty-second signal to establish said thirteenth signal.

17. A method in accordance with claim 11 wherein said step of establishing said ninth signal in response to said seventh signal comprises:

establishing a fifteenth signal representative of the actual flow rate of said hydrocarbon-containing feed stream;

multiplying said seventh signal by said fifteenth signal to establish a sixteenth signal which is representative of the flow rate of said primary fuel stream required to maintain the ratio represented by said seventh signal;

establishing a seventeenth signal representative of a desired primary air flow rate to primary fuel flow rate ratio;

multiplying said sixteenth signal by said seventeenth signal to establish an eighteenth signal representative of a desired primary air flow rate;

establishing a nineteenth signal representative of the actual oxygen concentration in the combustion gases withdrawn from said radiant section;

establishing a twentieth signal representative of the desired oxygen concentration in the combustion gases withdrawn from said radiant section;

comparing said nineteenth signal and said twentieth signal and establishing a twenty-first signal which is responsive to the difference between said nineteenth signal and said twentieth signal, wherein said twenty-first signal is scaled so as to be representative of any change in the primary air flow rate represented by said eighteenth signal required to maintain the actual oxygen concentration in the combustion gases withdrawn from said radiant section substantially equal to the desired concentration represented by said twentieth signal; and summing said eighteenth signal and said twenty-first signal to establish said ninth signal.

18. A method in accordance with claim 11 wherein said step of establishing said ninth signal in response to said seventh signal comprises:

establishing a fifteenth signal representative of the actual flow rate of said hydrocarbon-containing feed stream;

multiplying said seventh signal by said fifteenth signal to establish a sixteenth signal which is representative of the flow rate of said primary fuel stream required to maintain the ratio represented by said seventh signal;

establishing a seventeenth signal representative of the actual flow rate of said primary fuel stream;

establishing an eighteenth signal which is equal to the one of said sixteenth and seventeenth signals which is representative of the highest primary fuel flow rate;

establishing a nineteenth signal representative of a desired primary air flow rate to primary fuel flow rate ratio;

multiplying said eighteenth signal by said nineteenth signal to establish a twentieth signal representative of a desired primary air flow rate;

establishing a twenty-first signal representative of the actual oxygen concentration in the combustion gases withdrawn from said radiant section;

establishing a twenty-second signal representative of the desired oxygen concentration in the combustion gases withdrawn from said radiant section;

comparing said twenty-first signal and said twenty-second signal and establishing a twenty-third signal which is responsive to the difference between said twenty-first signal and said twenty-second signal, wherein said twenty-third signal is scaled so as to be representative of any change in the primary air flow rate represented by said twentieth signal required to maintain the actual oxygen concentration in the combustion gases withdrawn from said radiant section substantially equal to the desired concentration represented by said twenty-second signal; and summing said twentieth signal and said twenty-third signal to establish said ninth signal.

19. A method in accordance with claim 11 wherein said step of establishing said fourteenth signal in response to said twelfth signal comprises:

establishing a fifteenth signal representative of the actual flow rate of said hydrocarbon-containing feed stream;

multiplying said twelfth signal by said fifteenth signal to establish a sixteenth signal representative of the total fuel flow rate to said reforming furnace required to maintain the ratio represented by said twelfth signal;

establishing a seventeenth signal representative of a desired total flow rate of air to said reforming furnace to total flow rate of fuel to said reforming furnace ratio;

multiplying said sixteenth signal by said seventeenth signal to establish an eighteenth signal representative of the desired total flow rate of air to said reforming furnace;

establishing a nineteenth signal representative of the actual oxygen concentration in the effluent gases passing through said stack;

establishing a twentieth signal representative of the desired concentration of oxygen in the effluent gases passing through said stack;

comparing said nineteenth signal and said twentieth signal and establishing a twenty-first signal which is responsive to the different between said nineteenth signal and said twentieth signal, wherein said twenty-first signal is scaled so as to be representative of any changes in the total air flow rate represented by said eighteenth signal required to maintain the actual oxygen concentration in the combustion gases passing through said stack substantially equal to the desired concentration represented by said twentieth signal;

summing said eighteenth signal and said twenty-first signal to establish a twenty-second signal which is representative of the desired total flow rate of air of said reforming furnace;

establishing a twenty-third signal which is representative of the actual flow rate of said primary air stream delayed by a time constant representative of the time required for a change in the flow rate of said primary air stream to cause a change in said convection section; and subtracting said twenty-third signal from said twenty-second signal to establish said fourteenth signal.

20. A method in accordance with claim 11 wherein said step of establishing said fourteenth signal in response to said twelfth signal comprises:

establishing a fifteenth signal representative of the actual flow rate of said hydrocarbon-containing feed stream;

multiplying said twelfth signal by said fifteenth signal to establish a sixteenth signal representative of the total fuel flow rate to said reforming furnace required to maintain the ratio represented by said twelfth signal;

establishing a seventeenth signal representative of the actual flow rate of said primary fuel stream delayed by a time constant representative of the time required for a change in the flow rate of said primary fuel stream to cause a change in said convection section;

establishing an eighteenth signal representative of the actual flow rate of said auxiliary fuel stream;

summing said seventeenth signal and said eighteenth signal to establish a nineteenth signal representative of the total flow rate of fuel to said reforming furnace;

establishing a twentieth signal which is equal to the one of said sixteenth and nineteenth signals which is representative of the highest total fuel flow rate to said reforming furnace;

establishing a twenty-first signal representative of a desired total flow rate of air to said reforming furnace to total flow rate of fuel to said reforming furnace ratio;

multiplying said twentieth signal by said twenty-first signal to establish a twenty-second signal representative of the desired total flow rate of air to said reforming furnace;

establishing a twenty-third signal representative of the actual oxygen concentration in the effluent gases passing through said stack;

establishing a twenty-fourth signal representative of the desired concentration of oxygen in the effluent gases passing through said stack;

comparing said twenty-third signal and said twenty-fourth signal and establishing a twenty-fifth signal which is responsive to the difference between said twenty-third signal and said twenty-fourth signal, wherein said twenty-fifth signal is scaled so as to be representative of any changes in the total air flow rate represented by said twenty-second signal required to maintain the actual oxygen concentration in the effluent gases passing through said stack substantially equal to the desired concentration represented by said twenty-fourth signal;

summing said twenty-second signal and said twenty-fifth signal to establish a twenty-sixth signal which is representative of the desired total flow rate of air to said reforming furnace;

establishing a twenty-seventh signal which is representative of the actual flow rate of said primary air stream delayed by a time constant representative of the time required for a change in the flow rate of said primary air stream to cause a change in said convection section; and subtracting said twenty-seventh signal from said twenty-sixth signal to establish said fourteenth signal.

21. A method in accordance with claim 11 wherein said reforming furnace is a reforming furnace for a methanol process and wherein said fluid stream is boiler feed water.

* * * * *